US005561581A

United States Patent [19]

Watahiki et al.

[11] Patent Number: 5,561,581

[45] Date of Patent: Oct. 1, 1996

[54] ARRESTER AND MANUFACTURING METHOD THEREOF

[75] Inventors: Satoshi Watahiki; Shingo Shirakawa, both of Hitachi, Japan

[73] Assignee: Hitachi, Ltd., Tokyo, Japan

[21] Appl. No.: 370,657

[22] Filed: Jan. 10, 1995

[30] Foreign Application Priority Data

Jan. 11, 1994 [JP] Japan .................................... 6-001091

[51] Int. Cl.$^{6}$ .................................................. H02H 9/04

[52] U.S. Cl. .............................................. 361/117; 361/127

[58] Field of Search .................................. 361/2–14, 111, 361/117, 118, 120, 125, 126, 127, 131, 132, 601–606, 611–613, 618; 29/271, 272, 825, 854, 869, 845

[56] References Cited

U.S. PATENT DOCUMENTS 3,791,711 2/1974 Jonassen ................................ 361/120
3,958,156 5/1976 Tjebben .................................. 361/606

FOREIGN PATENT DOCUMENTS 55-105989 8/1980 Japan .
56-91402 7/1981 Japan .
61-125001 6/1986 Japan .
62-44681 9/1987 Japan .

*Primary Examiner*—Jeffrey A. Gaffin
*Assistant Examiner*—Ronald W. Leja
*Attorney, Agent, or Firm*—Fay, Sharpe, Beall, Fagan, Minnich & McKee

[57] ABSTRACT

The grounding tank 2 is laid on its side in the state that the covers 7A and 7B of the openings 3A and 3B at the both ends thereof are removed and the truck 8 is turned so that the side frame 8*b* on the back of the truck 8 and the bottom 8*a* with the wheel 11 are reversely positioned so as to mount the divided arrester units 7A and 7B to the tank 2 and the cover 7A (7B) and each arrester unit 4A (4B) are mounted and fixed to the side frame 8A*b*, 8B*b* so that they can be mounted and removed in the integrated state. The cover 7A (7B) and each arrester unit 4A (4B) are lined up in a horizontal line at the same height as that of the openings 3A and 3B of the grounding tank 2 after the truck 8 is turned and returned to the normal posture. The arrester units 4A and 4B are inserted and set into the grounding tank from side by moving the trucks 8A, 8B and the covers 7A and 7B are removed from the truck 8A, 8B and mounted on the tank 2 side so that they close the openings 3A and 3B at the same time. Thereby, the simplification, labor saving, and safety of arrester assembly are promoted.

15 Claims, 8 Drawing Sheets

ARRESTER AND MANUFACTURING METHOD THEREOF

BACKGROUND OF THE INVENTION

The present invention relates to a laminated arrester and a manufacturing method therefor. The manufacturing method means manufacturing of an arrester via the assembly process at factory and also assembling of an arrester at the job site.

Power is generated by a nuclear power station, hydraulic power station, or thermal power station in the distance and transmitted to a substation in the neighborhood of the demand site at a long distance and high voltage via aerial cables. Aerial power transmission often passes through mountainous regions and may be affected by an abnormal voltage due to a thunder phenomenon among natural phenomena. If aerial transmission is struck by lightning and a transmission and transformation device, for example, a gas insulating switch (GIS), transformer, breaker, or disconnecting switch is affected by an abnormal voltage and subjected to dielectric breakdown by an overvoltage, the power system is grounded, and the transmission and transformation device is damaged, and power transmission is made impossible.

Therefore, an arrester is installed in the power system as an overcurrent suppressor. It is required recently to scale down the transmission and transformation device due to a rise in land price. For example, a zinc oxide type arrester for gas insulating switch in which zinc oxide elements for switch are set in SF6 insulating gas is used so as to scale down the transmission and transformation device. Basically in the zinc oxide arrester, zinc oxide elements are overlaid in series and doughnut-shaped zinc oxide elements are fixed by an insulating bar and cylinder and arranged in gas, for example, SF6 gas in a straight line.

For a high voltage, when the arrangement constitution that a plurality of zinc oxide elements are laminated in a straight line is used, the arrester becomes longer and cannot be suited to an arrester to be connected to the gas insulating switch. Therefore, in the arrester indicated in Japanese Patent Application Laid-Open No. 56-91402 and Japanese Patent Publication No. 62-44681, a plurality of laminated element columns having many laminated zinc oxide elements are arranged in parallel and the laminated elements are electrically connected to each other so as to reduce the height of laminated elements. In the arrester indicated in Japanese Patent Application Laid-Open No. 61-125001, a horizontal type of arrester is used so as to solve the problem that it is difficult to apply an arrester which is made longer due to laminated zinc oxide elements to the gas insulating switch.

The assembly method for a zinc oxide arrester to be installed in the grounding tank is such that, as indicated in Japanese Patent Application Laid-Open No. 55-105989, in the case of vertical type, a lamination type arrester unit having a plurality of laminated zinc oxide elements is arranged on the tank sealing cover, and the grounding tank which is lifted up by a crane or others beforehand is moved down from above so as to cover the lamination type arrester unit, and the tank opening is made in contact with the cover so as to seal the tank hermetically. The assembly method for a horizontal type of arrester is such that the tank is assembled vertically in the same way as with the vertical type arrester and the finished arrester is turned and laid on its side.

However, as the power system increases in voltage, arresters become large and heavy and the assembly of arresters becomes difficult and dangerous.

SUMMARY OF THE INVENTION

An object of the present invention is to provide an arrester which can be produced easily and safely and can be operated by a small number of persons and a manufacturing method therefor.

To accomplish the above object, the present invention proposes an arrester and a manufacturing method therefor as indicated below.

The first invention is characterized in that in an arrester consisting of a lamination type arrester column which is arranged hermetically in the grounding tank, the grounding tank is of a horizontal type, and openings and tank sealing covers for closing the openings are installed at both ends thereof, and the lamination type arrester column consists of a first lamination type arrester unit and a second lamination type arrester unit which are divided into two parts in the axial direction, and the first and second lamination type arrester units can be inserted into the grounding tank in the state that they are integrated and fixed with the tank sealing covers respectively via each opening, and the units are set so that they can be connected to each other in the grounding tank, and the both ends of the lamination type arrester column in which the units are connected are supported by the tank sealing covers respectively.

The second invention is characterized in that in a manufacturing method for an arrester consisting of a lamination type arrester column which is arranged hermetically in the grounding tank:

(1) the grounding tank is laid on its side in the state that the tank sealing covers of the openings at the both ends thereof are removed;

(2) the aforementioned lamination type arrester column is unitized and trucks whereon the units hereinafter called lamination type arrester units) are to be mounted are prepared;

(3) the trucks are turned so that the side frames on the backs of the trucks and the bottoms with wheels are reversely positioned and the tank sealing covers and the lamination type arrester units are mounted and fixed to the side frames on the backs so that they can be mounted and removed in the integrated state; and (4) the covers and the lamination type arrester units are set so that they are supported by the side frames on the backs and lined up in a horizontal line at the same height as that of the openings of the grounding tank when the trucks are returned to the normal posture, and the lamination type arrester units are inserted into the grounding tank from side via the openings thereof by moving the trucks after the trucks are returned to the normal posture, and the covers are removed from the trucks and mounted on the grounding tank side so that they close the openings at the same time.

The third invention is characterized in that, on the assumption of the second invention, the grounding tank has the openings at the both ends thereof, and the lamination type arrester column consists of the first and second lamination type arrester units which are divided into two parts in the axial direction, and two said trucks are prepared, and the first lamination type arrester unit is mounted and fixed to one truck and the second lamination type arrester unit is mounted and fixed to the other truck so that the units and the tank sealing covers can be mounted and removed in the integrated state respectively, and the first and second lamination type arrester units are inserted into the grounding tank from the openings on the both sides thereof using the trucks so as to execute the step in Item (4).

The fourth invention is characterized in that, on the assumption of the second and third inventions and the fifth invention is characterized in that in a manufacturing method for an arrester consisting of a lamination the arrester column which is arranged hermetically in the grounding tank, the grounding tank has a height adjustment mechanism for adjusting the height of the grounding tank at the bottom thereof and the openings of the grounding tank, the lamination type arrester units, and the tank sealing covers can be set at the same height in a horizontal line at the step in Item (4).

The present invention is characterized in that an opening is installed at at least one end of the aforementioned grounding tank, and a tank sealing cover for closing this opening and the aforementioned lamination type arrester column unit (hereinafter called a lamination type arrest unit) are moved in the integrated state and inserted into the grounding tank from the opening, and the lamination type arrester unit is arranged in the grounding tank so as to be supported by the cover, and the cover is mounted to the grounding tank at the same time.

The operation of the first invention is that, according to the aforementioned constitution, the first and second lamination type arrester units which are divided into two parts in the axial direction are inserted and arranged in the grounding tank in the state that the units and each tank sealing cover are integrated and fixed and when the tank sealing covers are fixed to the grounding tank by bolting, the first and second arrest units are supported by the tank sealing covers respectively, so that the installing and mounting operation for the lamination type arrester column and covers can be simplified.

The lamination type arrester column is divided into the first and second lamination type arrester units and lightened in weight and the units are connected after they are arranged in the grounding tank, so that the burden imposed on transportation of the arrest units into the grounding tank and on assembly thereof is lightened and the first and second lamination type arrester units and the tank sealing covers integrated with them can be assembled in the state that the grounding tank is laid on its side from the beginning.

Moreover, after assembly, the lamination the arrester column is firmly supported by the sealing tank at the both ends of the grounding tank.

According to the second invention, in the assembly of the arrester, the large and heavy grounding tank is laid and fixed on its side from the beginning at the step of (1), and the comparatively light arrester units are mounted and fixed to the side frame on the back of each truck respectively at the steps of (2) and (3) (this mounting is executed in the state that each truck is turned so that the side frame on the back of the truck and the bottom with wheels are reversely positioned, so that the arrester units can be mounted easily on the side frame on the back of each truck), and when each truck is turned and returned to the normal posture at the step of (4), the lamination the arrester units and tank sealing covers are lined up in a horizontal line at the same height as that of the grounding tank in the integrated state. Therefore, when the trucks are moved toward the grounding tank as they are, the lamination type arrester units are carried (inserted) into the grounding tank. When the tank sealing covers are moved and mounted to the grounding tank by bolting thereafter, the arrester units are supported by the covers and the mounting of the arrester units to the grounding tank is finished.

As a result, the assembly operation of the arrester can be executed by moving and turning the small and comparatively light arrester units via the trucks leaving the large and heavy grounding tank as it is, so that the assembly operation can be executed safely and simply. Furthermore, when the arrester is completed, there is no need to change the finished product from the vertical posture to the horizontal one like a conventional product, and labor saving of the operation can be promoted more, and application of impact to the finished product can be substantially suppressed, so that the reliability of product is improved.

According to the third invention, the arrester assembly of the second invention is executed by dividing the lamination type arrester column into the first and second units, so that the burden imposed on mounting of the lamination type arrester column on the trucks, movement thereof by the trucks, and turning it can be lightened more and the simplification and labor saving of the operation can be promoted.

According to the fourth embodiment, even when the specifications for the grounding tank, lamination type arrester units, and tank sealing covers are different, the openings off the grounding tank, the lamination type arrester units, and the tank sealing covers can be adjusted in height so that they are lined up in a horizontal line by the tank height adjustment mechanism installed at the leg part of the grounding tank when the trucks are returned to the normal posture and the step in Item (4) can be executed always.

According to the fourth embodiment, regardless of the horizontal arrangement type or vertical arrangement type of the arrester, the small and comparatively light unitized lamination the arrester column and tank sealing covers can be moved in the integrated state and mounted to the grounding tank leaving the large and heavy grounding tank as it is and the simplification and labor saving of the assembly operation can be promoted.

DETAILED DESCRIPTION OF THE PREFERRED EMBODIMENTS,

The embodiments of the present invention will be explained with reference to FIG. 1 to FIG. 10.

Figure 8:
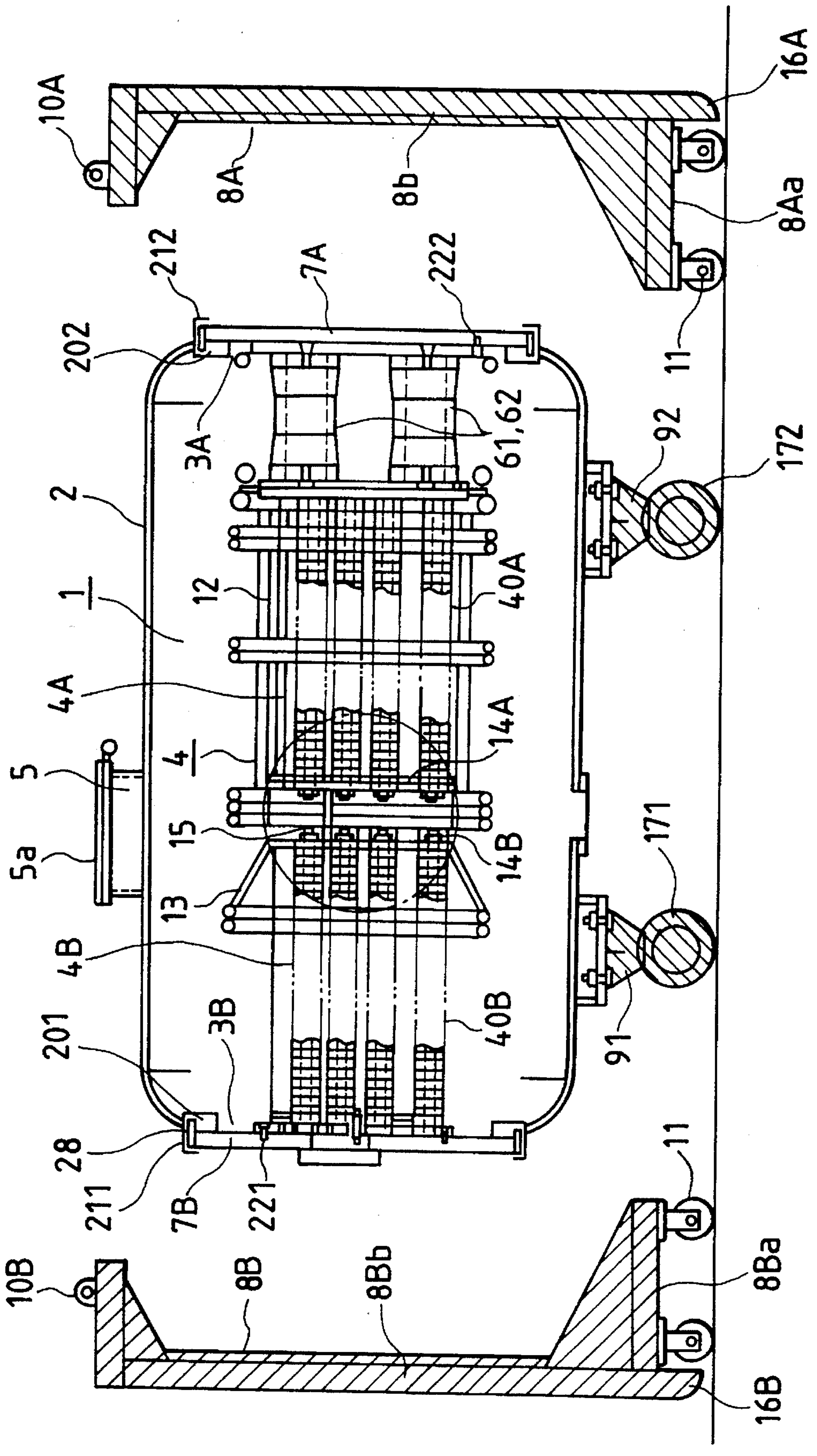
FIG. 8 is a side cross sectional view showing the status that the trucks are separated from the arrester units after the step shown in FIG. 7 is executed.

Firstly, the constitution of a gas insulating tank type arrester 1 relating to this embodiment will be explained with reference to FIG. 8. FIG. 8 is a cross sectional view showing the assembly completion state of the arrester 1.

In the drawing, the arrester 1 of this embodiment is of a horizontal type, and a cylindrical grounding tank 2 is laid on its side, and openings 3A and 3B are provided at the both ends thereof, and tank sealing covers 7A and 7B are fixed to the both ends of the grounding tank 2 via bolts 21 so as to close the openings 3A and 3B. Numerals 201, 202 indicate the periphery of each opening for passing each bolt 211, 212.

Numeral 4 indicates a lamination type arrester column arranged in the grounding tank 2 and it consists of first and second lamination type arrester units 4A and 4B which are divided in the axial direction and connected to each other via a stud bolt (connecting bolt) 15. The first lamination type arrester unit 4A is a lamination type arrester unit on the high voltage side (hereinafter called a high voltage side arrester unit or an arrester unit).and the second lamination type arrester unit 4B is a lamination type arrester unit on the low voltage side (hereinafter called a low voltage side arrester unit or an arrester unit). The high voltage side arrester unit 4A and the tank sealing cover 7A are integrated and fixed via bolts 221, 222, and the low voltage side arrester unit 4B and the tank sealing cover 7B are integrated and fixed via bolts 221, 222, and the arrester units 4A and 4B are supported by the covers 7A and 7B respectively. Numerals 61, 62 indicate an insulating cylinder installed on the side of the high voltage side arrester unit 4A and it is insulated from the ground and designed so as to always withstand the running voltage.

Each of the arrester units 4A and 4B is a plurality of laminated element columns 40A, 40B which are obtained by laminating many doughnut-shaped zinc oxide elements cylindrically, arranged in parallel, and fixed to an element column fixing plates 14A, 14B with bolts and nuts. The stud bolt 15 is attached to the element column fixing plates 14A, 14B of the low voltage side arrester unit 4B. Numeral 12 indicates a high pressure side shield and 13 indicates a low pressure side shield.

On the top of the grounding tank 2, an entrance and exit 5 for allowing operation inside the tank and a cover 5*a* thereof are provided. At the bottom of the grounding tank 2, tank legs 91, 92 and casters 171, 172 with a height adjustment mechanism are provided.

Next, the assembly steps for the gas insulating tank type arrester 1 of the aforementioned constitution will be explained.

Figure 1:
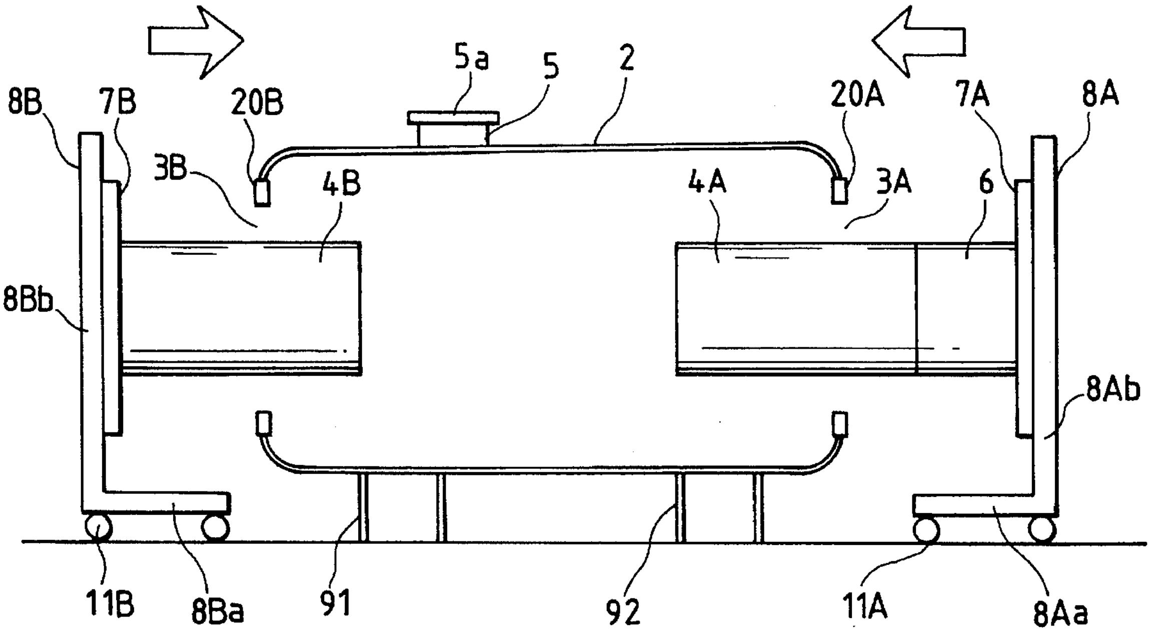
FIG. 1 is a schematic view showing the assembly operation status of an arrester relating to the first embodiment of the present invention.

FIG. 1 is an assembly schematic view of the arrester 1 and the assembly method of the arrester 1 shown in the drawing is as indicated below.

(1) Lay the grounding tank 2 on its side in the state that the tank sealing covers 7A and 7B of the openings 3A and 3B provided at the both ends thereof are removed.

(2) Two trucks 8A, 8B for mounting the high voltage side arrester unit 7A and the low voltage side arrester unit 7B to the grounding tank 2 are prepared.

Figure 3:
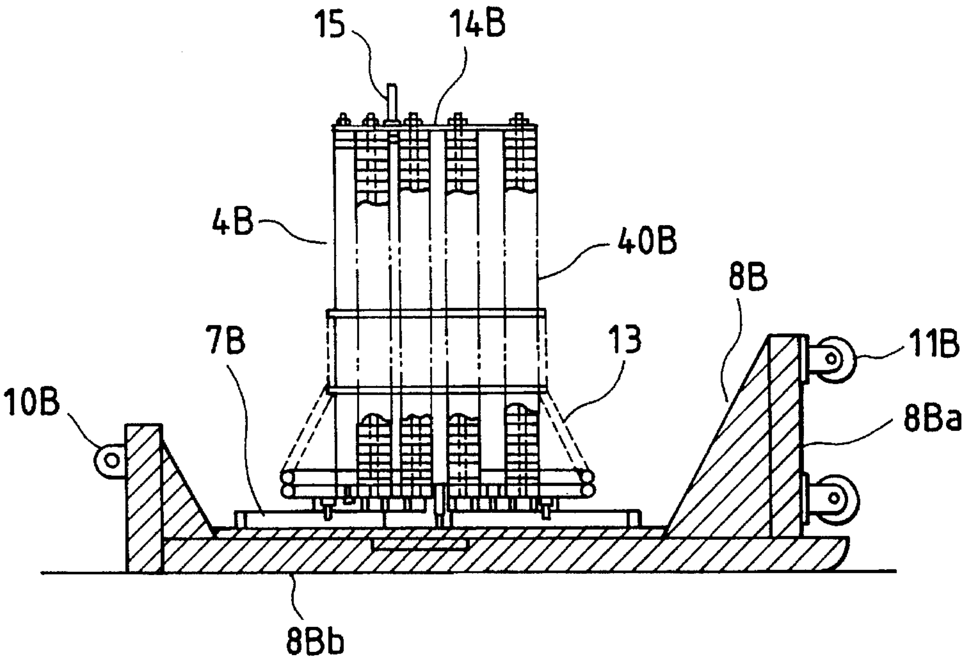
FIG. 3 is a side cross sectional view showing the status that a low voltage side lamination type arrester unit is mounted on the truck used in the first embodiment with the side frame of the truck down.
Figure 4:
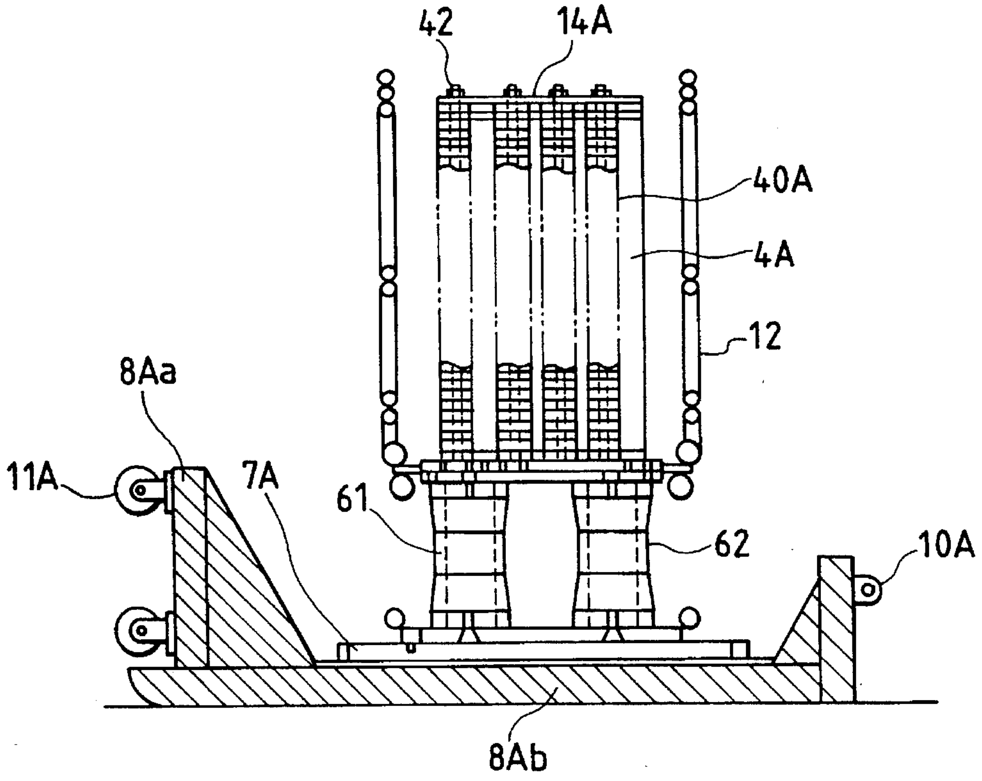
FIG. 4 is a side cross sectional view showing the status that a high voltage side lamination type arrester unit is mounted on the truck used in the first embodiment with the side frame of the truck down.

(3) The trucks 8A, 8B are turned so that the side frames 8A*b*, 8B*b* on the back and the bottom 8A*a*, 8B*a* with wheels 11A, 11B are reversely positioned as shown in FIGS. 3 and 4 and the tank sealing cover 7A (7B) and each arrester unlit 4A (4B) are mounted and fixed to the side frame 8A*b*, 8B*b* on the back with bolts in the integrated state so that they can be mounted and removed. The lamination type arrester units 4A and 4B are assembled on the tank sealing covers 7A and 7B which are mounted on the side frames 8A*b*, 8B*b* on the back at this step.

Figure 6:
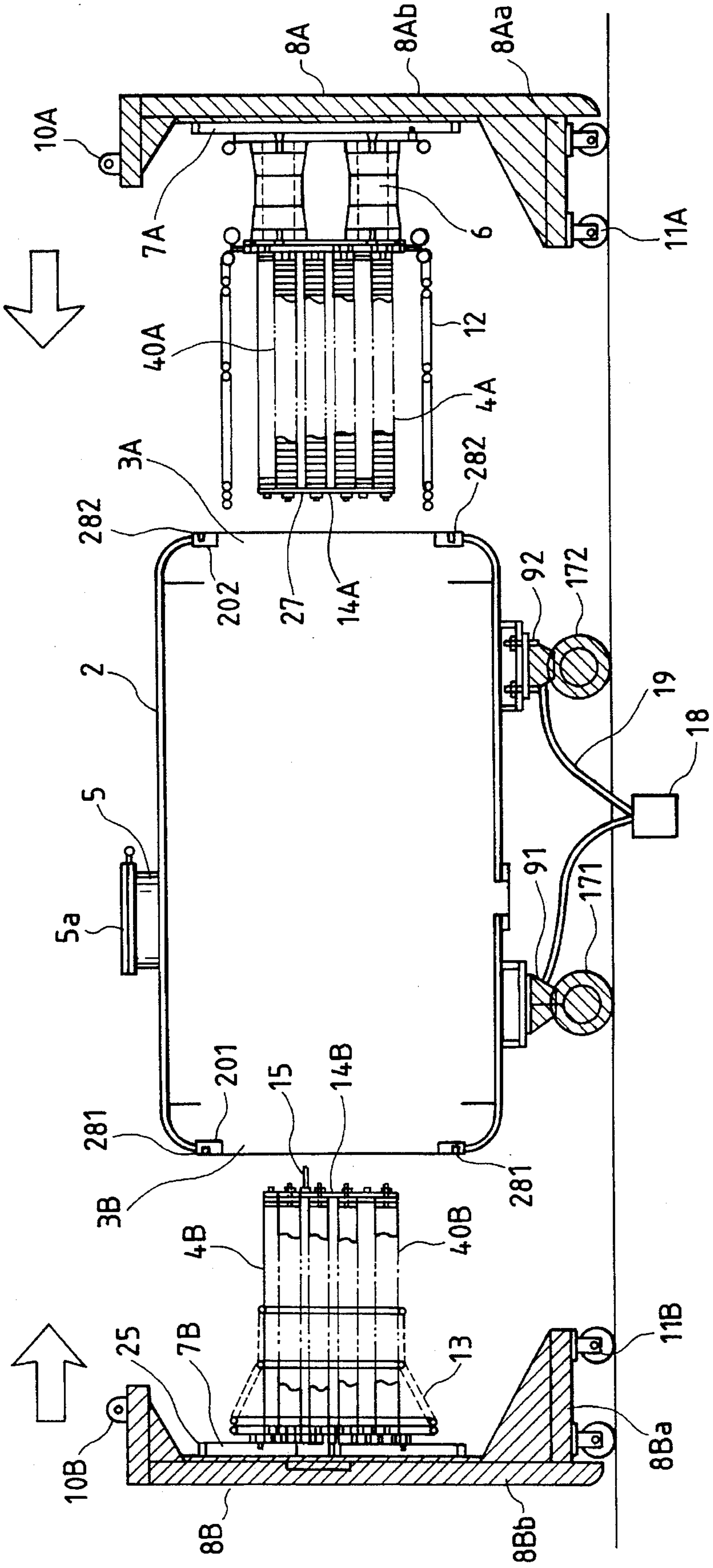
FIG. 6 is a side cross directional view showing the status that the above trucks with the arrester unit are arranged on the right and left side of the grounding tank after they are turned (returned to the normal posture).

(4) The cover 7A (7B) and each arrester unit 4A (4B) are supported by the side frame 8b on the back as shown in FIG. 1 when the trucks 8A, 8B are returned to the normal posture by turning and lined up at the same height as that of the openings 3A and 3B of the grounding tank 2 in a horizontal line by height adjustment by the tank casters 171, 172 as shown in Fig.6. After the trucks 8A, 8B are returned to the normal posture, the arrester units 4A and 4B are inserted and set into the grounding tank 2 via the openings 3A and 3B thereof from side by moving the trucks 8A, 8B and the covers 7A and 7B are removed and mounted on the grounding tank 2 side from the trucks 8A, 8B so as to close the openings 3A and 3B at the both ends of the tank.

At this step, when the covers 7A and 7B come in contact with the peripheries 20A, 20B of the openings 3A and 3B at the both ends of the tank, the arrester units 4A and 4B are connected to each other with the stud bolt 15 and the covers 7A and 7B are fixed to the peripheries 20A, 20B of the openings 3A and 3B at the both ends of the tank by bolting (bolting indicated by symbols 21 shown in FIGS. 7 and 8) at the same time, and then the covers 7A and 7B with the arrester units are removed from the trucks 8A, 8B.

Next, the aforementioned assembly steps will be explained in detail with reference to FIG. 2 to FIG. 8.

Figure 2:
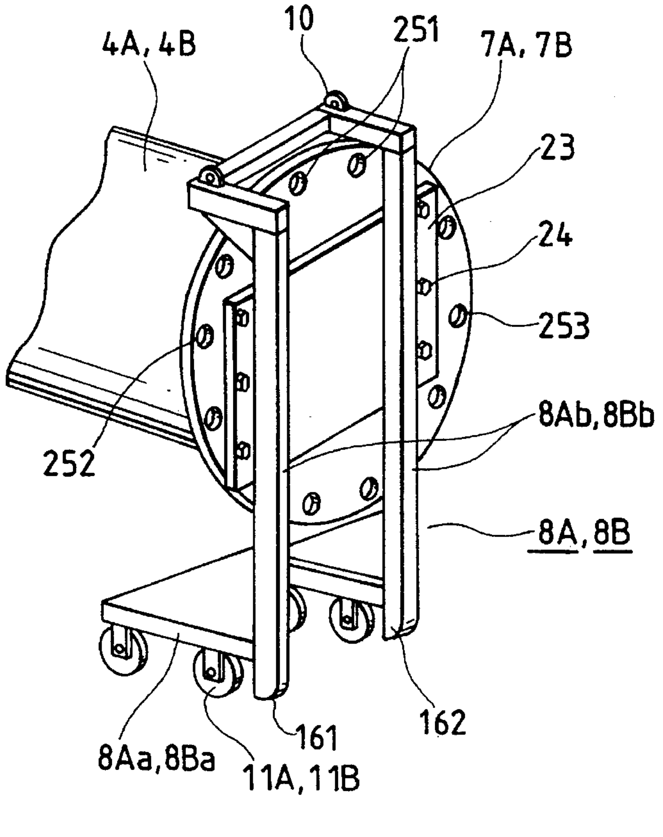
FIG. 2 is a perspective view showing the status that a tank sealing cover and lamination type arrester unit are mounted to the truck used in the first embodiment which is partially omitted.

FIG. 2 is a perspective view of the trucks 8A, 8B used in this embodiment. The side frames 8A*b*, 8B*b* consist of a plurality (2 each in this embodiment) of frame columns 8A*b*, 8B*b* which are arranged in parallel and fixed to a support plate 23, and the cover 7A (7B) with the arrester unit 4A (4B) is fixed to the support plate 23 with through-bolts 24, and the cover 7A (7B) and the arrester unit 4A (4B) are supported by this support plate 23. A hanging section 10 is installed above the frame columns 8A*b*, 8B*b* and when the trucks 8A, 8B with the arrester unit mounted on are turned, a crane rope 26 (see FIGS. 5A, 5B) for raising the truck 8 is hanged over the hanging section 10. Support points 161, 162 for turning the trucks 8A, 8B are installed at the bottoms of the frame columns 8*b*'.

FIG. 3 and FIG. 4 show details of the step of Item (3) mentioned above. FIG. 3 shows the status that the low voltage side arrester unit 4B and the cover 7B are assembled and mounted on the support plate 23 (see FIG. 2) of the side frame 8B*b* of the truck 8B perpendicularly to the side frame 8B*b* and FIG. 4 shows the status that the high voltage side arrester unit 4A and the cover 7A are assembled and mounted on the support plate 23 of the side frame 8A*b* of the truck 8A perpendicularly to the side frame 8A*b*.

Figure 5A:
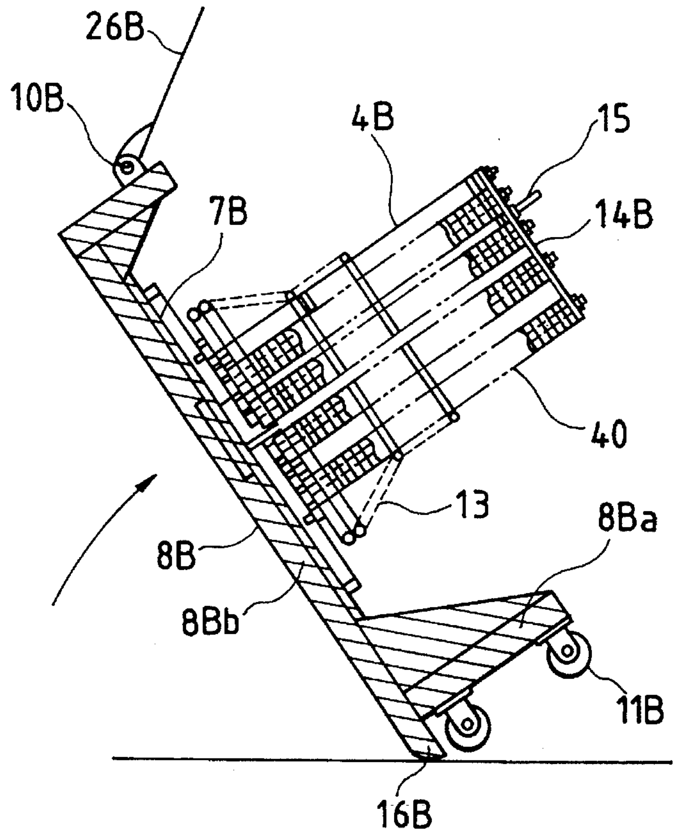
FIG. 5A and FIG. 5B are side cross sectional views showing the turning (raising) statuses of the truck with the arrester unit shown in FIG. 3 and FIG. 4.
Figure 5B:
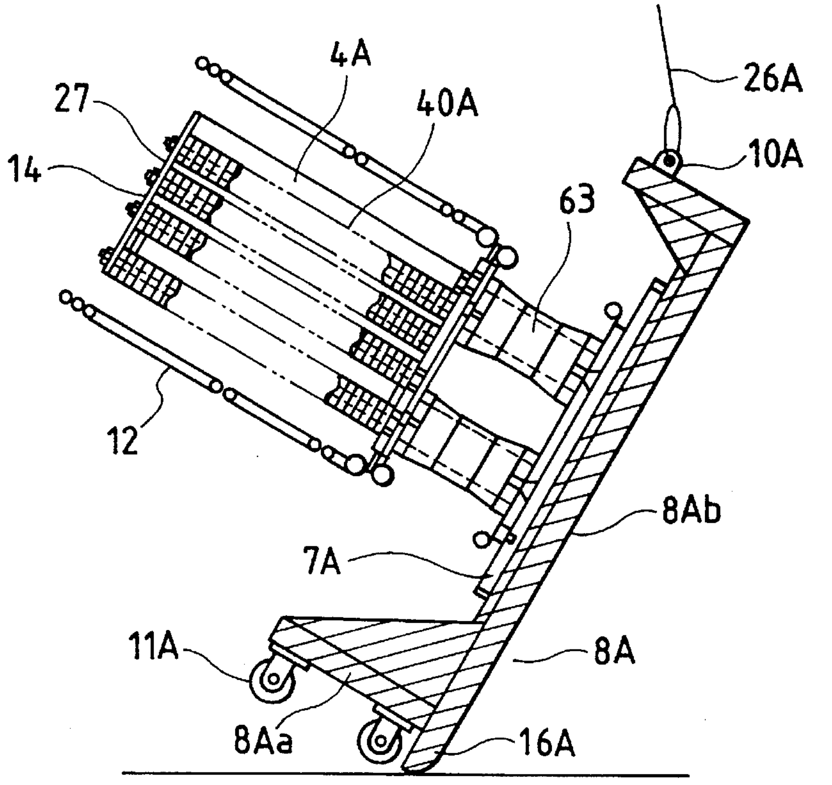

FIGS. 5A and 5A show the step of Item (4) mentioned above. The trucks 8A, 8B to which the arrester units 4A, 4B and the covers 7A, 7B are integrated and fixed are respectively turned by pulling the rope 26A, 26B hanged over the hanging sections 10A, 10B by a crane or others and raised so as to return to the normal posture. In this case, the lower parts 16 of the side frames 8A*b*, 8B*b* become fulcrums for turning. By doing this, the trucks 8A, 8B can be returned to the original status thereof safely and easily and the arrester units 4A and 4B can be inserted (introduced) easily into the grounding tank 2 by moving the trucks 8A, 8B as shown in FIG. 6 and FIG. 7 at the same time.

In FIG. 6, when the trucks 8A, 8B are returned to the normal posture by turning, the arrester units 4A and 4B supported by the side frames 8A, 8B*b* on the back are positioned on the fright and left sides of the grounding tank 2 and lined up at the same height as that of the openings 3A and 3B in a horizontal line. In this case, the grounding tank 2 is mounted on the height adjustment casters 171, 172 which can adjust the height finely by hydraulic pressure via the tank legs 91, 92 and differences of the lamination type arrester units 4A and 4B which are faced in the horizontal (transverse) direction and of the grounding tank 2 in height can be adjusted easily. A hydraulic pump 60 and hoses 61 are connected to the height adjustment casters 17. A plurality of wheels 11 are connected to the trucks 8A, 8B to which the lamination the arrester units are mounted. The wheels 11 reduce the labor for inserting the lamination type arrester units 4A and 4B which are arranged on the left and right sides of the grounding tank 2 into the grounding tank 2, also play the part of stopping runout of the lamination type arrester units 4A and 4B in the vertical and horizontal directions, and prevent the laminated zinc oxide element columns 40A, 40B which are extremely weak for impact from damage due to contact with the peripheries 201, 202 of the openings at the both ends of the tank when it is inserted into the tank 2.

Figure 7:
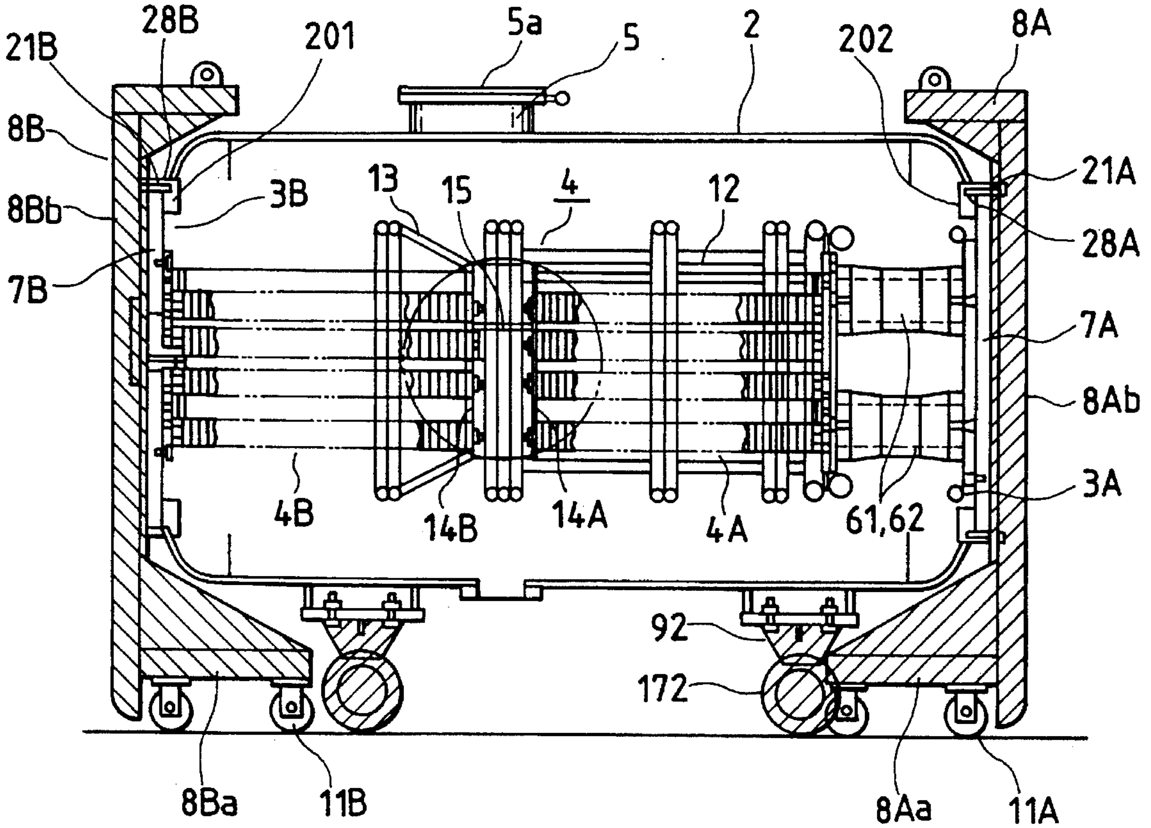
FIG. 7 is a side cross sectional view showing the connection status of the above arrester units in the grounding tank.

FIG. 7 shows a drawing that the lamination type arrester units 4A and 4B are inserted into the grounding tank 2 from right and left via the openings 3A and 3B. The lamination type arrester units 4A and 4B on the high voltage and low voltage sides are connected to each other by the stud bolt 15 via the respective element column fixing plates 14A, 14B in the grounding tank 2 and at the same time, the tank sealing covers 7A and 7B come in contact with the openings 3 at the both ends of the tank and the covers 7A and 7B are fixed to the grounding tank 2 with the bolts 21A, 21B through cover mounting holes 25 (see FIG. 2 and FIG. 6) made in the covers 7A and 7B and cover mounting holes 26 and 28 made in the peripheries 20 of the openings of the grounding tank so as to form a sealed grounding tank. Each unit 4A and 4B and the covers 7A and 7B are fixed to the grounding tank, and the bolts 24 shown in FIG. 2 are loosened, and the gas insulating tank type arrester 1 is separated from the trucks 8A, 8B as shown in FIG. 8, and the assembly is completed.

According to this embodiment, the production assembly operation) of the arrester can be executed by moving and turning the comparatively light arrester units (in this embodiment, the arrester units are divided into 2 parts such as the high voltage side and low voltage side arrester units 4A and 4B particularly so as to promote reduction of weight) via the trucks 8 leaving the large and heavy grounding tank 2 as it is. Therefore, the assembly operation can be executed safely and simply and the number of operators can be reduced (labor saving). Furthermore, after the arrester is completed, there is no need to change the finished product from the vertical posture to the horizontal one like a conventional product and application of impact to the finished product can be substantially suppressed, so that the reliability of product is improved.

Figure 9:
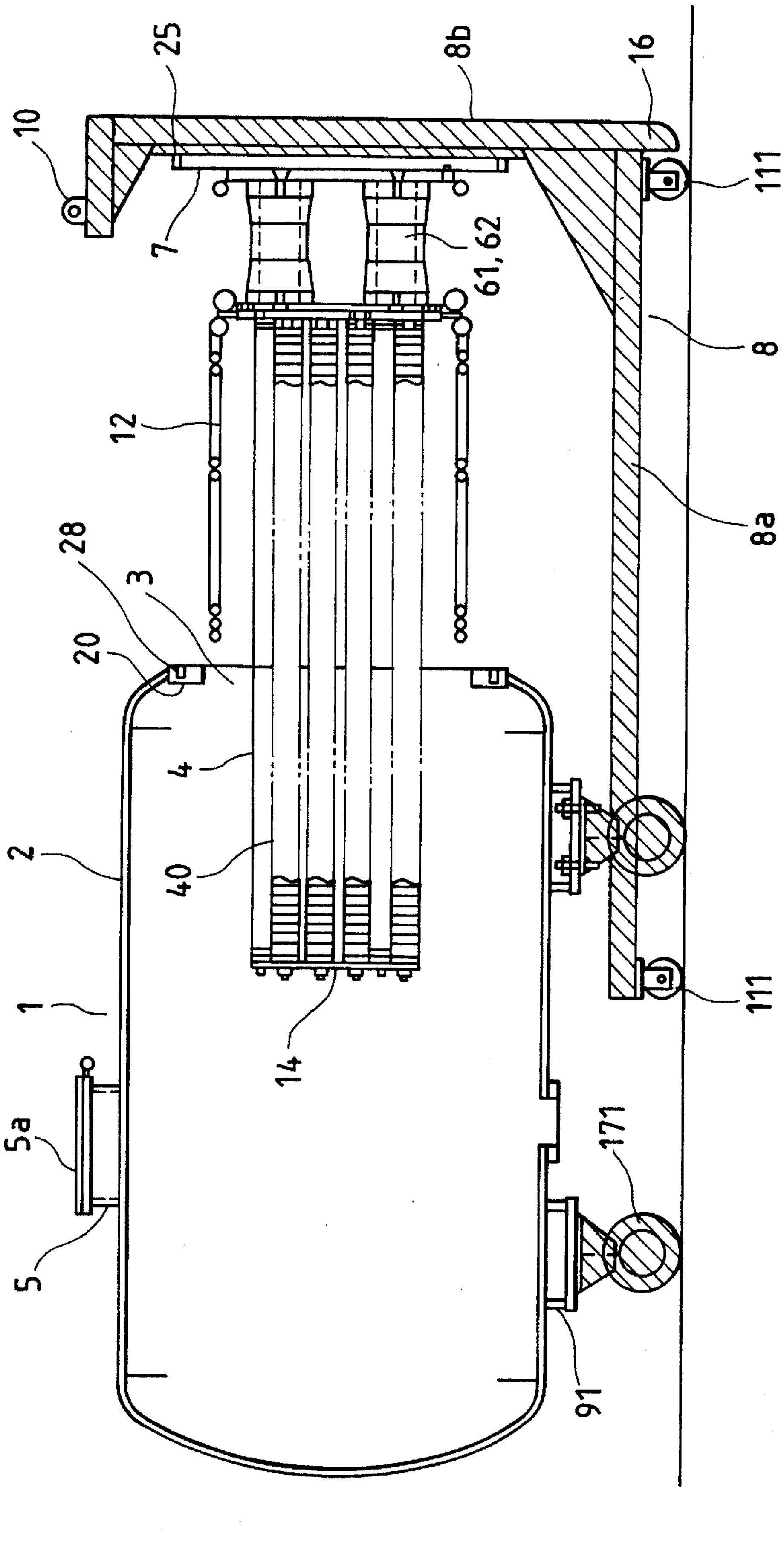
FIG. 9 is a side cross sectional view showing the assembly status of an arrester relating to the second embodiment of the present invention.

FIG. 9 is an illustration showing an example of the assembly steps for manufacturing the gas insulating tank type arrester 1 relating to the second embodiment of the present invention and the same symbols as those shown in the first embodiment mentioned above in the drawings indicate the common factors.

The differences from the first embodiment mentioned above are that one opening 3 for inserting the lamination type arrester unit is provided only at one end of the grounding tank 2, and the lamination type arrester column 4 is an individual column which is unitized without being divided, and one truck 8 is used.

According to this embodiment, after the assembly steps of Items (1) to (4) of the first embodiment mentioned above are executed, the gas insulating tank type arrester 1 is manufactured in principle. At the step of Item (3), the tank sealing cover 7 is mounted on one truck 8, and the lamination type arrester unit 4 consisting of the insulating cylinder 6 and the laminated elements 40 is inserted into the cover 7 from the opening 3 of the tank using the truck 8. In this case, when the total length of the grounding tank 2 is made longer than the total length of the lamination type arrester unit 4, the tip of the lamination type arrester unit 4 does not come into contact with the inner walls at the both ends of the tank 2, and there is no need to worry about damage to the laminated element column 40, and the operability is improved. The laminated elements 40 are not divided, so that the operation in the tank is reduced and the reliability is improved.

Figure 10:
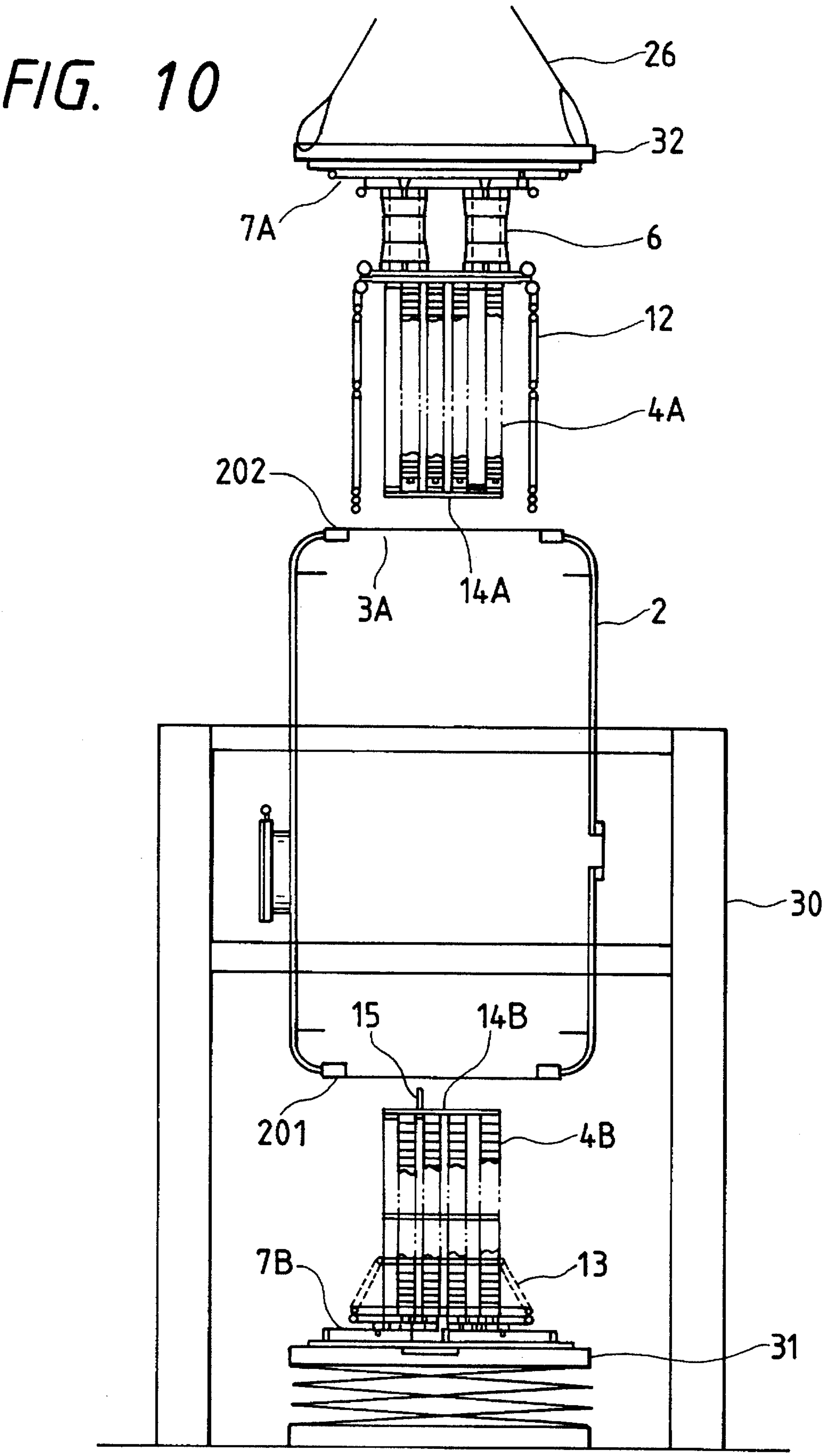
FIG. 10 is a side cross sectional view showing the assembly status of an arrester relating to the third embodiment of the present invention.

FIG. 10 shows the third embodiment of the present invention. According to this embodiment, when the arrester is assembled, the grounding tank 2 is set in the vertical posture and fixed in the state that it is floating in the air by supporting by a tank holding fame 30. The openings 3A and 3B at the both ends of the tank are directed upward and downward, and the arrester unit 4A which is one of the arrester units 4A and 4B which are divided into two parts is lifted up by the crane via the unit hanger and rope 26 in the state that it is fixed and integrated with the tank sealing cover 7A and the arrester unit 4B which is the other one is mounted on an elevator mechanism 31 by hydraulic pressure in the state that it is fixed and integrated with the tank sealing cover 7B.

The units 4A and 4B are positioned with the openings 3A and 3B of the tank, and the arrester unit 4A which is one of the two units 4A and 4B is inserted into the grounding tank 2 from above via the opening 3A by crane operation and the arrester unit 4B which is the other one is inserted into the grounding tank 2 via the elevator mechanism 31.

Thereafter, the arrester units 4A and 4B are connected to each other by the stud bolt 15, and the covers 7A and 7B are mounted to the peripheries 20 of the openings of the tank respectively, and then they are separated from the unit hanger 32 and the elevator mechanism 31. In the case of horizontal type, the finished product of arrester is laid on its side finally.

Also in this embodiment, regardless of the horizontal arrangement type or vertical arrangement type of the arrester, the comparatively light arrester units 4A and 4B can be moved together with the tank sealing covers 7A and 7B and the assembly of arrester can be executed leaving the large and heavy grounding tank 2 as it is, so that the labor saving of the assembly operation can be promoted.

According to the first invention, a structure that the large and heavy tank is fixed, and the light lamination type arrester units which are divided into units are moved together with the tank sealing covers which are integrated with the units, and the arrester is assembled is used, so that the simplification of the arrester assembly operation and the operation safety can be promoted. Furthermore, the first and second lamination type arrester units and the tank sealing covers which are integrated with them can be mounted in the state that the grinding tank is laid on its side from the beginning, so that the rationalization of operation can be promoted, and the lamination type arrester column can be supported firmly by the covers at the both ends of the tank after assembly, and a highly reliable tank type arrester can be provided.

According to the second and third inventions, the same effect as that of the first invention can be obtained and furthermore by moving and turning the trucks, the assembly operation of arrester is made easy and the rationalization of operation and labor saving can be promoted. Furthermore, according to this manufacturing method, both the grounding tank and lamination type arrester units are always in contact with the ground partially, so that the center of gravity is low and the safe arrester assembly operation can be guaranteed.

According to the fourth invention, the openings of the grounding tank, the lamination type arrester units, and the tank sealing covers can be adjusted in height so that they are lined up in a horizontal line. Therefore,, various effects mentioned above can be obtained in arrester assembly under different specifications.

Also in the fifth invention, the simplification and rationalization of the assembly operation of arrester can be promoted.

Furthermore, a characteristic feature of the present invention is in supporting the lamination type arrester unit 4, 4A or 4B by the tank sealing cover 7, 7A or 7B. In the.case of the conventional lamination type arrester unit, is is supported by not only the tank sealing cover but some other supporting member provided in the grounding tank 2.

In the present invention, such the other supporting member provided in the grounding tank 2 is not provided, because the other supporting member cause to make the electric charge on the arrester unit 4, 4A or 4B concentrated. Therefore, the arrester unit 4, 4A or 4B is supported by only the tank sealing cover 7, 7A or 7B and the grounding tank 2 mounting the tank sealing cover must be fully strong and naturally become very heavy.

On the other hand, the arrester unit 4, 4A or 4B, especially the high voltage side thereof should be accurately installed on the tank sealing cover 7, 7A or 7B.

In the present invention, the voltage side of the arrester unit 4, 4A or 4B is previously in stalled on the tank sealing cover 7, 7A or 7B through the insulating member 6, 61, 62 and then a combined member of the arrester unit 4, 4A or 4B, the insulating member 6, 61, 62 and the tank sealing cover 7, 7A or 7B is moved on the grounding tank 2 which is heavier than the combined member in order to instal it on the grounding tank 2.

As, the lighter combined member is moved so as to be in stalled on the heavy tank, the arrester unit is easily and in accurate installed on the grounding tank 2.

Furthermore, the arrester unit may be devided into two parts and each of the arrester unit may be previouly installed on the tank sealing cover, thereby the divided arrester unit becomes more lighter so as to be easier to instal it in accurate.

Especially, it is very significant that the at least the high voltage side of the arrester unit is previouly installed on the tank sealing cover through the insulating member, because the installing accuracy of the arrester unit is more needed in the high voltage side of the arrester unit than the low voltage side thereof.

We claim:

1. An arrester comprising a lamination type arrester column which is arranged hermetically in a grounding tank, wherein:

said grounding tank is of a horizontal type and is supported horizontally on a base, and an opening and a tank sealing cover for closing said opening are installed at at least one end of said grounding tank, and said lamination type arrester column is a lamination type arrester unit which extends in an axial direction, and said lamination type arrester unit is integrated and fixed with said tank sealing cover and is inserted into said grounding tank via said opening, and the end of said lamination type arrester column is perpendicularly supported on said tank sealing cover.

2. A manufacturing method for an arrester comprising a lamination type arrester column which is arranged hermetically in a grounding tank, wherein:

(1) said grounding tank is laid horizontally on a base with a tank sealing cover for closing an opening of an end of said grounding tank removed;

(2) said lamination type arrester column is fixed to a truck via said tank sealing cover whereon the column is to be mounted;

(3) said truck is turned from a normal posture so that a side frame of said truck is positioned horizontally on a support surface with said tank sealing cover and said lamination type arrester column are perpendicularly mounted and fixed to said side frame; and (4) so that they are supported by said side frame and lined up in a horizontal line at the same height as that of the opening of said grounding tank when said truck is returned to the normal posture, and said lamination type arrester column is inserted into said grounding tank from said side via the opening thereof by moving said truck after said truck is returned to the normal posture, and said cover is removed from said truck and mounted on said grounding tank open end and said opening is closed at the same time.

3. A manufacturing method for an arrester according to claim 2, wherein said grounding tank has said openings at the both ends thereof, and said lamination type arrester column comprises first and second lamination type arrester units which are divided into two parts in the axial direction, and two said trucks are prepared, and said first lamination type arrester unit is mounted and fixed to one truck and said second lamination type arrester unit is mounted and fixed to the other truck so that the units and said tank sealing covers can be mounted and removed in the integrated state respectively, and said first and second lamination type arrester units are inserted into said grounding tank from the openings on the both sides thereof using the trucks so as to execute said step in Item (4).

4. A manufacturing method for an arrester according to claim 2, wherein said grounding tank has a height adjustment mechanism for adjusting the height of the grounding tank at the bottom thereof and the opening of said grounding tank, said lamination type arrester column, and said tank sealing cover can be set at the same height in a horizontal line at said step in Item (4).

5. A manufacturing method for an arrester according to claim 3, wherein said grounding tank has a height adjustment mechanism for adjusting the height of the grounding tank at the bottom thereof and the openings of said grounding tank, said lamination type arrester units, and said tank sealing covers can be set at the same height in a horizontal line at said step in Item (4).

6. A manufacturing method for an arrester comprising a lamination type arrester column unit which is arranged hermetically in a grounding tank, wherein:

an opening is installed at at least one end of said grounding tank, and a tank sealing cover for closing the opening and said lamination type arrester column unit are moved in an integrated state and inserted into said grounding tank from said opening, and said lamination type arrester unit is arranged in said grounding tank so as to be perpendicularly supported on said cover, and said cover is mounted to said grounding tank at the same time.

7. An arrester comprising a lamination type arrester which is arranged hermetically in a grounding tank, wherein:

said grounding tank is laid horizontally on a base, and at least a sealing cover for closing an opening is installed on one end of the grounding tank, and at least a high voltage side of said lamination type arrester previously installed perpendicularly on said tank sealing cover through a insulating member is inserted into said grounding tank via said opening so as to be installed on the grounding tank.

8. A method for manufacturing an arrester having a lamination type arrester which is arranged hermetically in a grounding tank, comprising the steps of:

previously installing at least a high voltage side of said lamination type arrester on a sealing cover for closing an opening on one end of the grounding tank through an insulating member;

moving the sealing cover on the grounding tank, said sealing cover perpendicularly installing the high voltage side of said lamination type arrester through a insulating member; and fixing said sealing cover on the grounding tank.

9. A method for manufacturing an arrester as defined in claim 8, said method characterized in that:

said sealing cover is installed on a truck before installing said high voltage side on said sealing cover, and said sealing cover is moved on the grounding tank by said truck after installing said high voltage side on said sealing cover.

10. A method for manufacturing an arrester as defined in claim 8, said method characterized in that:

said lamination type arrester is divided into the high voltage side and a low voltage side, said high voltage side and said low voltage side are respectively installed on said sealing cover and other sealing cover for closing said opening and an opening on an other side of the grounding tank, and then said sealing cover and said other sealing cover are respectively moved on both side of the grounding tank so as to be fixed on the grounding tank.

11. A method for manufacturing an arrester as defined in claim 10, said method characterized in that;

said sealing cover and said other sealing cover are respectively installed on plural trucks before respectively installing said high voltage side and said low voltage side on said sealing cover and other sealing cover, and said sealing cover and said other sealing cover are respectively moved on both side of the grounding tank by said trucks, after respectively installing said high voltage side and said low voltage side on said sealing cover and other sealing cover.

12. An arrester, comprising:

a grounding tank disposed horizontally and supported on a base having at least one opening and at least one tank sealing cover for closing said at least one opening:

a lamination type arrester column perpendicularly supported on said at least one tank sealing cover to extend into said grounding tank in an axial direction of said grounding tank such that when said at least one tank sealing cover is secured for closing said at least one opening, said lamination type arrested column is hermetically sealed in said grounding tank.

13. An arrester according to claim 12, further including said grounding tank having two of said at least one openings and two corresponding ones of said at least one tank sealing cover, and wherein said lamination type arrester column includes first and second lamination type arrester units perpendicularly mounted to corresponding ones of said two tank sealing covers wherein said first and second lamination type arrester units are joined together in said grounding tank simultaneously with the closure of said two tank sealing covers.

14. An assembly method for an arrester, comprising the following steps:

supporting a grounding tank horizontally on a base, said grounding tank having at least one opening and at least one corresponding tank sealing cover for closing said at least one opening;

disposing a lamination type arrester column in said grounding tank by mounting said lamination type arrester column to said at least one tank sealing cover, and further mounting said tank sealing cover to a side frame portion of a truck having wheels for moving said lamination type arrester column into said grounding tank through said at least one opening in a normal posture of said truck, wherein said lamination type arrester column is mounted to said at least one tank sealing cover by turning said truck over on said side portion so that said lamination the arrester column is assembled to said tank sealing cover perpendicularly while said at least one tank sealing cover is supported substantially horizontally by said truck, and then returning said truck to said normal posture after said lamination type arrester column is fixed to said at least one tank sealing cover; and inserting said lamination type arrester column with said truck while closing said at least one opening with said at least one tank cover.

15. An assembly method for an arrester, comprising the following steps:

supporting a grounding tank horizontally on a base, said grounding tank having two openings and corresponding tank sealing covers for closing said openings;

disposing a lamination type arrester column in said grounding tank wherein said lamination type arrester column includes first and second lamination type arrester units perpendicularly mounted to corresponding ones of said tank sealing covers, including mounting said tank sealing covers to corresponding side frame portions of trucks having wheels for moving said first and second lamination type arrester units respectively into said grounding tank through said openings in a normal posture of said trucks, wherein said first and second lamination type arrester units are respectively mounted to said tank sealing covers by turning said trucks over on said side portions so that said first and second lamination type arrester units are assembled to said tank sealing covers perpendicularly while said tank sealing covers are supported substantially horizontally by said trucks, and then returning said trucks to said normal posture after said first and second lamination type arrester units are fixed to said tank sealing covers; and inserting said first and second lamination type arrester units into said grounding tank with said trucks while closing said openings with said tank sealing covers.

* * * * *